Dec. 27, 1966    D. V. CHENOWETH    3,294,113
WELL BORE PRESSURE REGULATOR APPARATUS
Filed Dec. 2, 1963    2 Sheets-Sheet 1
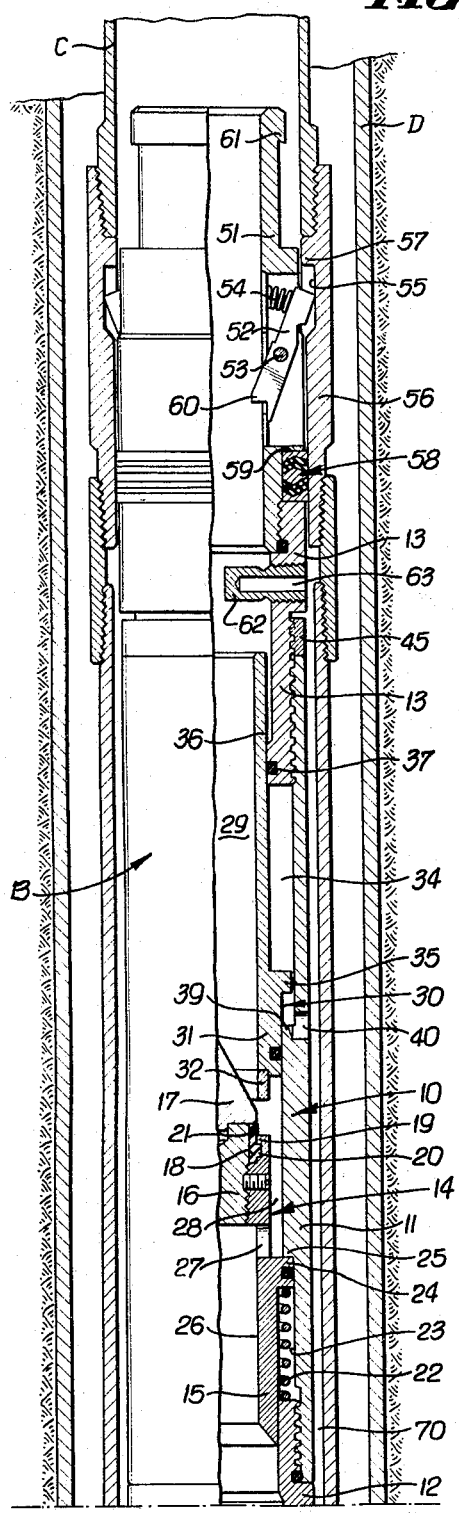
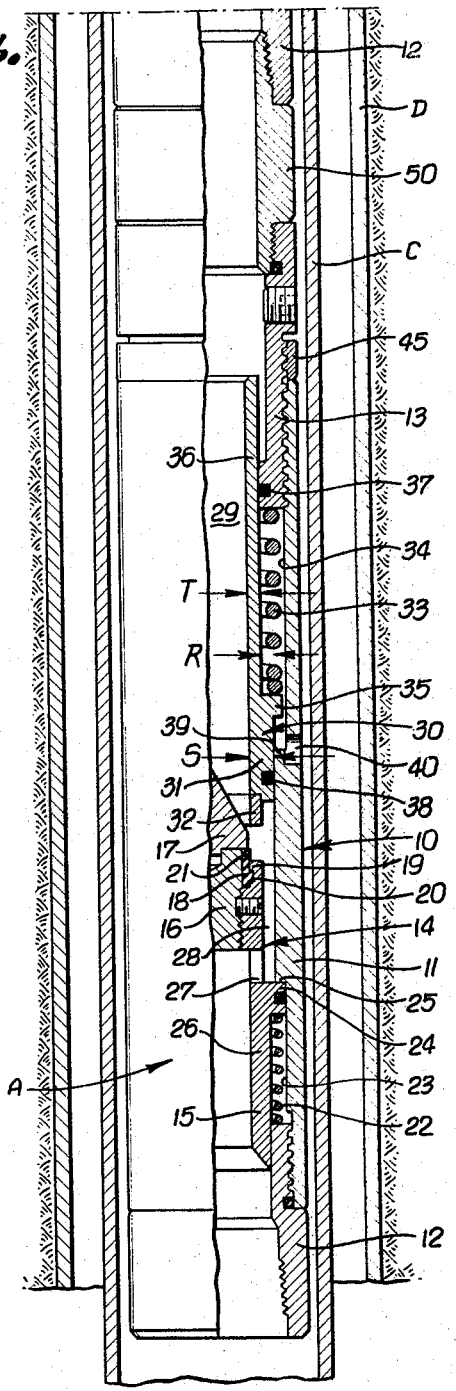
INVENTOR.
DAVID V. CHENOWETH
BY
Mellin and Hanscom
ATTORNEYS.

Dec. 27, 1966  D. V. CHENOWETH  3,294,113
WELL BORE PRESSURE REGULATOR APPARATUS
Filed Dec. 2, 1963  2 Sheets-Sheet 2
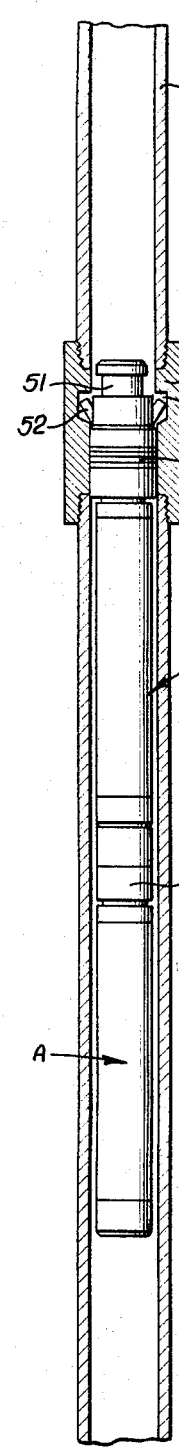
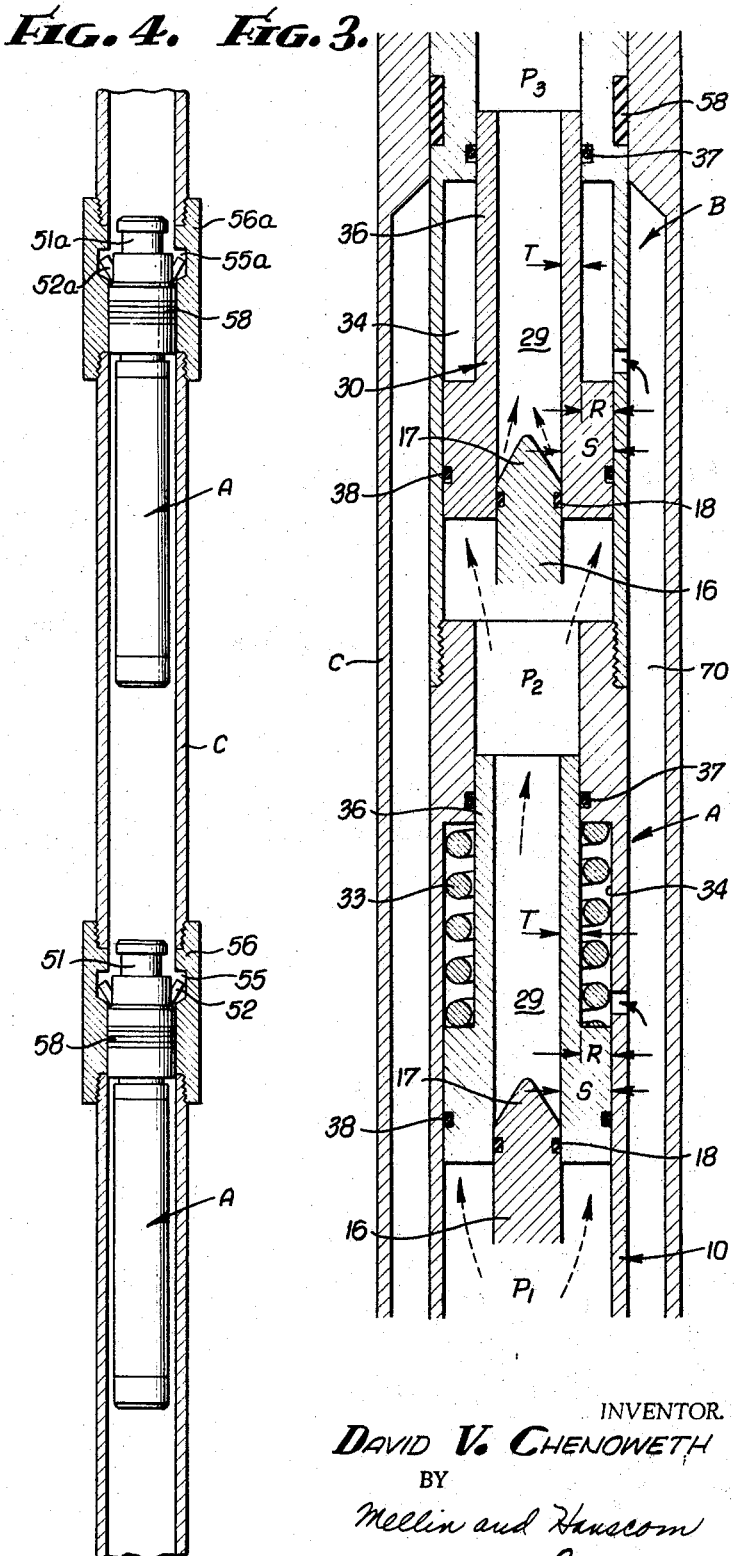
INVENTOR.
DAVID V. CHENOWETH
BY
*Mellin and Hanscom*
ATTORNEYS.

United States Patent Office

3,294,113
WELL BORE PRESSURE REGULATOR APPARATUS

David V. Chenoweth, Houston, Tex., assignor to Baker Oil Tools, Inc., Los Angeles, Calif., a corporation of California
Filed Dec. 2, 1963, Ser. No. 327,220
17 Claims. (Cl. 137—508)

The present invention relates to well bore apparatus, and more particularly to apparatus for regulating or reducing the pressure of fluids flowing in a well bore.

Pressure regulators have been disposed in well bores to decrease the pressure of the flowing well fluids within the bores themselves, allowing the lower pressure fluids, which cool considerably upon expanding through the regulators, to be reheated by the well formations during their upward travel to the top of the well bore. This eliminates hydrate formations in the surface connections that would result in the event substantial pressure reduction occurred in the region of the surface connections.

Heretofore, a large reduction in pressure could not be obtained through the regulator, or combination of regulators, disposed in a well bore. Although the pressure drop through prior regulators can be adjusted, the adjustment is only accomplished with difficulty, and only upon partial disassembly of the apparatus. Moreover, during shut-in periods, that is, periods in which fluid flow is closed at the surface, prior fluid erosion of the valve parts causes leakage to occur, allowing the pressure in the production tubing above the regulator to build up. When the well is again opened to production, the expansion of the high pressure fluid at the surface causes freezing of the equipment, particularly in cold weather areas.

Accordingly, an object of the present invention is to provide an improved pressure regulator apparatus, particularly useful in a well bore, through which a comparatively great pressure drop can be obtained, if desired.

Another object of the invention is to provide a pressure regulator, particularly useful in a well bore, capable of being arranged in tandem with the same or similar design of regulator to provide a combined pressure drop through the tandem arrangement that is much greater than the sum of the pressure drops that can be obtained for each regulator when used in series in the well bore.

A further object of the invention is to provide a pressure regulator apparatus, particularly useful in a well bore, in which fluid erosion of the valve parts of the apparatus is less likely to result in leaking of the apparatus during well shut-in periods.

An additional object of the invention is to provide a pressure regulating apparatus, particularly adapted for use in a well bore, and embodying a spring that determines the pressure drop through the regulator, in which the stress of the spring can be readily adjusted to vary the pressure drop, without partially or otherwise disassembling the tool. This enables the regulator to be easily adjusted while remaining connected to a test pressure source.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURES 1a and 1b together constitute a combined longitudinal sectional and side elevational view of a tandem arrangement of pressure regulators disposed in a well bore, FIG. 1b being a lower continuation of FIG. 1a;

FIG. 2 is a side elevational view, on a reduced scale, of the tandem arrangement of pressure regulators disposed in a string of production tubing;

FIG. 3 is a diagrammatic view of a tandem arrangement of pressure regulators in production tubing;

FIG. 4 is a longitudinal section through production tubing illustrating a plurality of pressure regulators arranged therein in series.

The pressure regulator illustrated in the drawings can be used in production tubing singly, in a series arrangement to secure a pressure drop through the combination of regulator apparatus, which is the sum of the pressure drops through each regulator when used singly, or in tandem in which the total pressure drop through the apparatus greatly exceeds the pressure drop obtainable when the regulators are used in series. The regulator apparatus A, B is incorporated within a string of production tubing C, or the like, disposed within a well casing D in a well bore. The particular regulator apparatus illustrated is removably mounted in the production tubing, but, if desired, it can be made a permanent part thereof.

A tandem arrangement of pressure regulators A, B is illustrated in FIGS. 1a, 1b, 2 and 3, a lower pressure regulator A being secured to an upper pressure regulator b. The upper and lower pressure regulators are substantially alike, and, in fact, can be identical, although with the tandem hook-up, and because of the design of each pressure regulator, it is not necessary to employ a regulator spring in the upper regulator.

The lower regulator A includes a tubular body or housing 10 made of several sections. The central elongate main portion 11 of the housing has its lower part threadedly secured to a lower housing sub 12, and its upper part threadedly secured to an upper housing or body sub 13 that can be adjusted therewithin by rotating the sub in one direction or the other with respect to the housing portion 11. A lower valve member or seat 14 is disposed in the housing, having a lower skirt portion 15 slidable in the lower sub 12, the skirt portion being threadedly secured to a plug 16 that has a tapered or conical erosion resisting seat 17 secured thereto in any suitable manner, as by brazing. A seal ring 18 is disposed around the plug 16 immediately below the erosion resisting or tungsten carbide seat 17, the seal ring being embraced by the upper portion of the tubular valve member 15, which secures the rubber or elastomer seal ring in place by virtue of the overlapping and interlocking flanges 19, 20 at the upper portion of the valve member and the lower portion of the seal ring. The upper portion 21 of the seal ring is exposed and its periphery may be substantially cylindrical, to provide a cylindrical seat to be embraced and engaged by a companion valve element, as described hereinbelow.

The lower valve member or seat 14 is yieldably held in an upward position by a helical compression spring 22 disposed in a lower spring chamber 23 between the housing 11 and skirt 15, the lower end of the spring bearing against the upper end of the lower sub 12, which functions as a spring seat, and its upper end against an external flange 24 above the skirt 15, the flange being engageable with a downwardly facing stop shoulder 25 on the tubular housing, which limits the upper position of the valve seat 14 in the body or housing 10.

The well production flowing upwardly through the tubular production string C can pass through the lower sub 12 into the central passage 26 of the lower valve member, then passing outwardly through one or more side ports 27 in the valve member above its flange 24 into an annular space 28 between the lower valve member 15 and the tubular housing 10 above the flange. Such fluid can then flow upwardly past the tungsten carbide seat 17 into the central passage 29 through an upper valve member 30 and then upwardly within the production tubing C.

The upper valve member 30 is tubular in form and is movable longitudinally in the housing into and from engagement with the lower valve member or seat 14, for the purpose of controlling the flow of fluid through the regulator. The upper valve member 30 has a lower head portion 31 slidable along the inner wall of the tubular body 10, there being an erosion resisting ring 32 brazed, or otherwise suitably secured, to the lower portion of the valve sleeve 30, which is adapted to move downwardly around the erosion resisting carbide seat 17 and into engagement with the upper end of the lower valve member 15 in surrounding and sealing relation with the elastomer seal 18. The pressure of the fluid flowing upwardly through the lower valve member 15 and through its ports 27 will act upon the lower end of the upper valve member 30 and shift it upwardly away from the seat 14 against the force of a helical compression, regulator spring 33 mounted in a spring chamber 34 between the upper portion of the upper valve member or sleeve 30 and the outer housing or body portion 11. The upper end of the spring 33 bears against the lower end of the upper housing sub 13, the lower end of the spring bearing against an external flange 35 on the sleeve 30, urging the latter downwardly within the housing 10. Leakage of fluid between the upper portion 36 of the valve member 30 and the upper housing sub 13 is prevented by a suitable side seal ring 37 in the sub slidably and sealingly engaging the periphery of the sleeve portion 36. Similarly, leakage of fluid between the exterior of the lower head portion 31 of the sleeve valve member and the inner wall of the tubular body or housing 10 is prevented by a suitable side seal ring 38 mounted in the head and slidably and sealingly engaging the inner wall of the housing.

The spring 33 tends to elongate and shift the valve sleeve 30 downwardly, the maximum extent of shifting being determined by engagement of its flange 35 with an upwardly facing stop shoulder 39 on the housing. The pressure of the fluid flowing upwardly through the production tubing C is acting upon the lower portion or head 31 of the valve sleeve and tends to shift it upwardly against the force of the spring 33. This pressure also tends to shift the valve seat 14 upwardly, but its upward movement is limited by engagement of the flange 24 with the housing shoulder 25. When so engaged, the valve sleeve 30 can move upwardly from sealing relation to the lower valve seat 14, the fluid flowing between the tungsten carbide seat 17 and the tungsten carbide valve head ring 32 and upwardly through the central passage 29 of the sleeve 30 for continued upward movement through the tubing string C.

The fluid pressure in the spring chamber 34 is equal to the fluid pressure externally of the tubular body or housing 10, since one or a plurality of ports 40 are provided in the spring chamber above the location of the valve head seal ring 38, establishing communication between the spring chamber and the exterior of the housing. Thus, the fluid pressure in the production tubing C below the housing 10 is capable of passing through the central passage 26 and port 27 of the valve seat 14 into the annular space 28 between the valve seat 14 and housing 10 for action upon the lower end or head of the valve sleeve 30 over the area S, which is the area between the inner surface of the valve sleeve 30 and the sealing diameter of the valve head 31 against the inner wall of the tubular housing 10. This same pressure is present in the spring chamber 34 and acts downwardly on the valve head 31 over the area R, which is the annular area between the sealing diameter of the upper seal ring 37 against the periphery of the upper portion 36 of the valve member or sleeve and the sealing diameter of the valve head seal 38 against the inner wall of the tubular housing. The pressure in the apparatus above the valve sleeve 30 is acting in a downward direction on the latter over its annular area T, which is the annular area between the inner wall of the valve sleeve 30 and its peripheral portion in sealing engagement with the upper side seal ring 37.

In the specific design illustrated, the area S minus the area R equals the area T. Accordingly, the pressure in the production tubing C below the regulator A is exerting an upward force on the valve sleeve over an effective area T, and the pressure in the production tubing immediately above the valve sleeve 30 is acting in a downward direction on the latter over the same area T. To open the valve, the unit pressure below the regulator must exceed the pressure thereabove by the force exerted by the spring divided by the area T.

The pressure drop across the lower regulator A can be expressed by the following formula:

$$kx = T(P_1 - P_2)$$

wherein $k$ = spring constant,
$x$ = preset spring travel,
$T$ = annular area of upper portion 36 of upper sleeve valve member 31,
$P_1$ = tubing pressure below regulator,
$P_2$ = tubing pressure above valve member 31.

Or stated in another manner:

$$P_2 = P_1 - \frac{kx}{T}$$

When the pressure below the regulator exceeds the upper pressure by a value corresponding to the force of the regulator spring 33, the upper valve 30 will be shifted upwardly from its seat 14, the fluid flowing between the tungsten carbide ring 32 and the tungsten carbide seat 17 and upwardly through the valve member 30. The greater the pressure difference, the greater will be the upward movement of the valve sleeve 30 against the force of its spring 33, the fluid flow being throttled in passing between the seat 17 and ring 32 and its pressure being reduced. Such fluid flow tends to erode the parts, but the erosion is resisted by the fact that the seat 17 and ring 32 are made of comparatively hard material, such as tungsten carbide. Even if some fluid erosion does occur, the shutting in of the well at the top of the well bore will still cause the spring 33 to shift the upper valve member 30 downwardly and will place the tungsten carbide ring 32 around and in sealing relation to the elastomer seal ring portion 21, insuring against leakage of fluid through the regulator valve. The seal ring 18 itself is not subjected to the erosive wear, since the fluid expansion occurs above and in spaced relation to the elastomer ring 18 between the tungsten carbide seat 17 and the tungsten carbide ring 32.

The pressure differential through the regulator can be adjusted by adjusting the compression of the spring 33. This is accomplished without dismantling any of the parts. It is only necessary to turn the upper housing sub 13 relative to the main housing portion 11 to thread the sub inwardly or outwardly of the latter, in order to vary the compression of the regulator spring 33. When the proper adjustment has been made, the sub 13 is locked to the main portion 11 of the housing by a suitable lock nut 45 threaded on the sub and which can be forced against the upper end of the main housing portion 11 of the housing member 10.

The adjustment of the spring 33 can occur while the regulator is connected to a suitable test pressure source. Thus, the lower body sub 12 can be connected to a source of pressure above ground and the compressive force of the spring 33 readily adjusted by turning the upper housing sub 13 until the pressure at which the valve sleeve 30 shifts away from its companion seat 14 is noted on the test pressure apparatus. The lock nut 45 can then be tightened against the housing member 11 to lock the housing sub to the housing member and thereby maintain the regulator spring 33 in the desired state of compression.

Normally, the lower valve seat 14 remains in its upper position with its flange 24 engaging the stop shoulder 25, since flow of fluid through the tubing string C is occurring in an upward direction. At times, it might be desirable to force fluid downwardly through the regulator apparatus. This can occur with the regulator illustrated since a predominant downward force sufficient to overcome the compression of the lower spring 22 will shift the valve seat 14 downwardly, the upper valve sleeve 30 moving downwardly with it until its flange 35 engages the housing stop shoulder 39, after which the seat 14 will move downwardly away from the valve head ring 32 and allow fluid to flow between this seat and ring, around the lower valve member 14 and in through the ports 27 for continued downward movement through the central passage 26 and the tubing string. Upon relieving of the downwardly imposed pressure, the lower spring 22 reshifts the valve seat 14 back to its upper position, and carries the upper valve member 30 upwardly to a position in which its flange 35 is spaced above the stop shoulder 39, allowing ample range of movement of the valve sleeve upwardly and downwardly with respect to the valve seat 14.

The regulator described above can be used in a tandem arrangement, or in a series arrangement, in the production tubing. A tandem arrangement is disclosed in FIGS. 1a, 1b, 2 and 3. As shown, the upper sub 13 of the lower regulator A is threadedly attached to a coupling 50, which is, in turn, threadedly secured to the lower sub 12 of the upper regulator B. The upper regulator can be a duplicate of the lower regulator, except that it is not necessary to employ a regulator spring 33 in the chamber 34 of the upper regulator, although, if desired, such spring can be allowed to remain therein. A very large pressure drop can be secured through the tandem arrangement of regulators, far in excess of the pressure drops obtainable with a series arrangement of regulators.

As shown, the the upper sub 13 of the upper regulator B is threadedly attached to a mandrel 51 which carries a plurality of latches or dogs 52 mounted on pivot pins 53 and adapted to be urged outwardly by helical springs 54 into a lock groove 55 in a landing nipple 56 secured in and forming part of the string of production tubing C. The latches or dogs 52 face upwardly and are adapted to engage the upper end 57 of the nipple groove to prevent upward movement of the tandem arrangement of regulators B, A. Flow of fluid through the production tubing C and around the exterior of the regulator B is prevented by a suitable side seal structure 58, such as the oppositely directed chevron seals, mounted on the lower portion of the mandrel 51 and held in position between a downwardly facing shoulder 59 on the mandrel and the upper end of the upper housing sub 13. This seal structure will seal against the inner wall of the landing nipple 56.

The latches or dogs 52 have lower retracting noses 60 projecting into the mandrel passage, so that a suitable retracting tool (not shown) can be lowered down through the tubing string C into engagement with the noses 60 to force the lower ends of the latches outwardly and their upper ends inwardly from the grooves 55, to release the apparatus from the tubing string and permit its withdrawal to the top of the well bore. The releasing and retrieving apparatus is well known and need not be described. It is sufficient to state that in addition to releasing the latches 52, the retracting apparatus includes an overshot mechanism adapted to engage under an upper flange 61 of the mandrel 51 and it also includes an apparatus for engaging and breaking an equalizing plug 62 threaded in the upper body sub 13 so as to open a passage 63 through the latter and thereby allow the pressure in the production tubing below the apparatus and above the regulator valves to equalize.

With the tandem arrangement of regulator valves B, A, the pressure in the production tubing below the lower regulator can pass through the space 70 between both regulators and the production tubing C into the spring chamber portion 34 of the upper regulator B. The pressure of the fluid in the lower regulator A passes through the coupling 50 into the upper regulator B, and it is this lower pressure $P_2$ which is effective for operation on the lower portion or over the area S of the upper regulator valve sleeve 30 to shift it upwardly with respect to its seat 14, or to open position. The pressure above the upper regulator valve sleeve 30 is acting downwardly over the area T, and such pressure can be designated as $P_3$.

For purpose of simplicity of illustration, the tandem arrangement of regulators is shown somewhat diagrammatically in FIG. 3. Assuming no spring to be present in the chamber 34 of the upper regulator B, since a spring is actually not needed therein, the pressure drop across the upper regulator can be expressed by the following equation:

$$R(P_1-P_2)=T(P_3-P_2)$$

or $$P_3=P_2+\frac{R}{T}(P_2-P_1)$$

Substituting for $P_2$ in the above equation $$P_3=P_1-\frac{kx}{T}\left(1+\frac{R}{T}\right)$$

Pressure drop above both regulators, $$P_1-P_3=\frac{kx}{T}\left(1+\frac{R}{T}\right)$$

The above equations will demonstrate that a very great pressure drop can be obtained through the tandem arrangement of regulators, because of the fact that the lower pressure $P_1$ is allowed to pass into the chamber 34 of the upper regulator B for downward action on the upper regulator sleeve valve member 30. In a typical case, a single regulator in the production tubing, as illustrated in the drawings, can have its spring force adjusted to provide a maximum differential of 3,300 p.s.i. $(P_1-P_2)$. If such a spring containing regulator is used as the lower member A and the same pressure regulator, without the spring, is used as the upper member B in a tandem hook-up, such as disclosed in FIGS. 1a, 1b, 2 and 3, the maximum pressure differential obtainable through the tandem arrangement can be 16,000 p.s.i.

If two regulators were disposed in the string of production tubing in series, such as disclosed in FIG. 4, in which both regulators contain springs 33, the maximum differential $(P_3-P_1)$ obtainable in the production tubing through both regulator valves would be 6,600 p.s.i. As shown in FIG. 4, the lower regulator A is mounted in a production tubing C and has the latches or dogs 52 on its mandrel 51 received within the internal groove 55 of a lower landing nipple 56, the upper housing sub 13 and mandrel 51 being sealed against the inner wall of the lower landing nipple. Similarly, the upper regulator A is latched in the groove 55a of an upper landing nipple 56a and its upper housing sub 13 and mandrel 51 are sealed against the inner wall of this upper landing nipple.

The fact of providing a seal 38 between the valve head 31 and the inner wall of the tubular body 10 below the port 40, establishing fluid communication between the spring chamber 34 and the exterior of the housing 10, allows the tandem arrangement of pressure regulators A, B to effect a considerably increased pressure drop through the apparatus, as compared to a series arrangement disclosed in FIG. 4.

It is, accordingly, apparent that a pressure regulating apparatus, particularly useful as a bottom hole regulator, has been provided which permits a very large drop in pressure to be effected. If erosion occurs on either or both of the valve members 30, 14 through which the fluid is passing and expanding, there is substantially less, or no likelihood of, leakage in the event the well is shut-in, the upper valve member 30 moving downwardly of the lower valve member, since the valve head element 32 does not move into engagement with a solid seat, such as the tungsten carbide seat 17, but moves downwardly below the region where the erosive wear occurs and into sealing engagement with the elastomer ring 18. In addition to the chance of leakage being minimized considerably, if not completely eliminated, the differential pressure through the regulator embodying the spring 33 is easily adjusted without dismantling the parts, simply by loosening the lock nut 45 and threading the upper sub 13 into or out of the main housing portion 11, followed by relocking or jamming of the nut 45 against the upper end of the housing member.

I claim:

1. In a pressure regulator for fluid flowing through tubing in a well bore: a body adapted to be mounted in the tubing and having a fluid passage therethrough; a first valve member in said body providing a valve seat; a second valve member in said body movable upwardly from said seat by fluid pressure in said body therebelow; means providing a lower seal between the exterior of said second member and body to prevent fluid in said body below said second member from flowing between the entire circumference of said exterior of said second member and body, said second member having a surface responsive to fluid pressure in said body thereabove to urge said second member downwardly toward said valve seat; means providing an upper seal between the exterior of said second valve member and body to prevent fluid in said body above said second member from flowing between the exterior of said second member and body; the seal diameter of said lower seal being greater than the seal diameter of said upper seal; said body and second membet providing a space therebetween and between said upper and lower seals; said body having another passage establishing fluid communication between the exterior of said body and said space to allow fluid pressure in the tubing externally of said body to pass through said another passage into said space and act on and urge such second member downwardly toward said seat, the fluid pressure force below said second valve member and acting on said second valve member to urge said second valve member upwardly from its seat being greater than the fluid pressure force in said space and acting downwardly on said second valve member to urge said second valve member downwardly toward its seat.

2. In a pressure regulator for fluid flowing through tubing in a well bore: a body adapted to be mounted in the tubing and having a fluid passage therethrough; a first valve member in said body providing a valve seat; a second valve member in said body movable upwardly from said seat by fluid pressure in said body therebelow; means providing a lower seal between the exterior of said second member and body to prevent fluid in said body below said second member from flowing between the entire circumference of said exterior of said second member and body, said second member having a surface responsive to fluid pressure in said body thereabove to urge said second member downwardly toward said valve seat; means providing an upper seal between the exterior of said second valve member and body to prevent fluid in said body above said second member from flowing between the exterior of said second member and body; the seal diameter of said lower seal being greater than the seal diameter of said upper seal; said body and second member providing a space therebetween and between said upper and lower seals; said body having another passage establishing fluid communication between the exterior of said body and said space to allow fluid pressure in the tubing externally of said body to pass through said another passage into said space and act on and urge such second member downwardly toward said seat, the fluid pressure force below said second valve member and acting on said second valve member to urge said second valve member upwardly from its seat being greater than the fluid pressure force in said space and acting downwardly on said second valve member to urge said second valve member downwardly toward its seat; and spring means engaging said second member for yieldably urging said second member downwardly toward engagement with said seat.

3. In a pressure regulator for fluid flowing through a conduit: a body adapted to be mounted in the conduit and having a fluid passage therethrough; a first valve member in said body providing a valve seat; a second valve member in said body movable downstream from said seat by fluid pressure in said body upstream thereof; means providing a first seal between the exterior of said second member and body to prevent fluid in said body upstream of said second member from flowing between the entire circumference of said exterior of said second member and body, said second member having a surface responsive to fluid pressure in said body downstream of said second member to urge said second member toward said valve seat; means providing a second seal between the exterior of said second valve member and body downstream of said first seal to prevent fluid in said body downstream of said second member from flowing between the exterior of said second member and body; the seal diameter of said first seal being greater than the seal diameter of said second seal; said body and second member providing a space therebetween and between said seals; said body having another passage establishing fluid communication between the exterior of said body and said space to allow fluid pressure in the conduit externally of said body to pass through said another passage into said space and urge said second member in an upstream direction toward said seat, the fluid pressure force upstream of said second valve member and acting on said second valve member to urge said second valve member from its seat being greater than the fluid pressure force in said space and acting on said second valve member to urge said second valve member toward its seat.

4. In a pressure regulator for fluid flowing through a conduit: a body adapted to be mounted in the conduit and having a fluid passage therethrough; a first valve member in said body providing a valve seat; a second valve member in said body movable downstream from said seat by fluid pressure in said body upstream thereof; means providing a first seal between the exterior of said second member and body to prevent fluid in said body upstream of said second member from flowing between the entire circumference of said exterior of said second member and body, said second member having a surface responsive to fluid pressure in said body downstream of said second member to urge said second member toward said valve seat; means providing a second seal between the exterior of said second valve member and body downstream of said first seal to prevent fluid in said body downstream of said second member from flowing between the exterior of said second member and body; the seal diameter of said first seal being greater than the seal diameter of said second seal; said body and second member providing a space therebetween and between said seals; said body having another passage establishing fluid communication between the exterior of said body and said space to allow fluid pressure in the conduit externally of said body to pass through said another passage into said space and urge said second member in an upstream direction toward said seat, the fluid pressure force upstream of said second valve member and acting on said second valve member to urge said second valve member from its seat being greater than the fluid pressure force in said space and acting on said second valve member to urge said second valve member toward its seat; and spring means engaging said second member for yieldably urging said second member upstream toward said seat.

5. In a pressure regulator for fluid flowing through tubing in a well bore: a body adapted to be mounted in the tubing and having a fluid passage therethrough; a valve seat in said body; a valve sleeve slidable longitudinally in said body to and from said seat and movable upwardly from said seat by fluid pressure in said body therebelow; means providing a lower seal between the exterior of said sleeve and body to prevent fluid in said body below said sleeve from flowing between the entire circumference of said sleeve exterior and body, said valve sleeve having a surface responsive to fluid pressure in said body thereabove to urge said valve sleeve downwardly toward said valve seat; means providing an upper seal between the exterior of said sleeve and body to prevent fluid in said body above said sleeve from flowing between said sleeve exterior and body; the seal diameter of said lower seal being greater than the seal diameter of said upper seal to provide an upwardly facing transverse surface on said sleeve above said lower seal; said body and sleeve providing a space therebetween and between said seals in which said transverse surface is located; said body having another passage establishing fluid communication between the exterior of said body and said space to allow fluid pressure in the tubing externally of said body to pass through said another passage into said space and act on said transverse surface to urge said sleeve downwardly toward said seat, the fluid pressure force below said valve sleeve and acting on said valve sleeve to urge said valve sleeve upwardly from its seat being greater than the fluid pressure force in said space and acting on said valve sleeve to urge said valve sleeve downwardly toward its seat.

6. In a pressure regulator for fluid flowing through tubing in a well bore: a body adapted to be mounted in the tubing and having a fluid passage therethrough; a valve seat in said body; a valve sleeve slidable longitudinally in said body to and from said seat and movable upwardly from said seat by fluid pressure in said body therebelow; means providing a lower seal between the exterior of said sleeve and body to prevent fluid in said body below said sleeve from flowing between the entire circumference of said sleeve exterior and body, said valve sleeve having a surface responsive to fluid pressure in said body thereabove to urge said valve sleeve downwardly toward said valve seat; means providing an upper seal between the exterior of said sleeve and body to prevent fluid in said body above said sleeve from flowing between said sleeve exterior and body; the seal diameter of said lower seal being greater than the seal diameter of said upper seal to provide an upwardly facing transverse surface on said sleeve above said lower seal; said body and sleeve providing a space therebetween and between said seals in which said transverse surface is located; said body having another passage establishing fluid communication between the exterior of said body and said space to allow fluid pressure in the tubing externally of said body to pass through said another passage into said space and act on said transverse surface to urge said sleeve downwardly toward said seat, the fluid pressure force below said valve sleeve and acting on said valve sleeve to urge said valve sleeve upwardly from its seat being greater than the fluid pressure force in said space and acting on said valve sleeve to urge said valve sleeve downwardly toward its seat; and spring means engaging said sleeve for yieldably urging said sleeve downwardly toward engagement with said seat.

7. In a pressure regulator for fluid flowing through a conduit: a body adapted to be mounted in the conduit and having a fluid passage therethrough; a valve seat in said body; a valve sleeve slidable longitudinally in said body to and from said seat and movable downstream from said seat by fluid pressure in said body upstream thereof; means providing a first seal between the exterior of said sleeve and body to prevent fluid in said body upstream of said sleeve from flowing between the entire circumference of said exterior of said sleeve and body, said valve sleeve having a surface responsive to fluid pressure in said body downstream of said valve sleeve to urge said valve sleeve toward said valve seat; means providing a second seal between the exterior of said sleeve and body downstream of said first seal to prevent fluid in said body downstream of said sleeve from flowing between the exterior of said sleeve and body; the seal diameter of said first seal being greater than the seal diameter of said second seal to provide a transverse surface between said seals facing in a downstream direction; said body and sleeve providing a space therebetween and between said seals in which said transverse surface is located; said body having another passage establishing fluid communication between the exterior of said body and said space to allow fluid pressure in the conduit externally of said body to pass through said another passage into said space and act on said transverse surface to urge said sleeve in an upstream direction toward said seat, the fluid pressure force upstream of said valve sleeve and acting on said valve sleeve to urge said valve sleeve from its seat being greater than the fluid pressure force in said space and acting on said valve sleeve to urge said valve sleeve toward its seat.

8. In a pressure regulator for fluid flowing through a conduit: a body adapted to be mounted in the conduit and having a fluid passage therethrough; a valve seat in said body; a valve sleeve slidable longitudinally in said body to and from said seat and movable downstream from said seat by fluid pressure in said body upstream thereof; means providing a first seal between the exterior of said sleeve and body to prevent fluid in said body upstream of said sleeve from flowing between the entire circumference of said exterior of said sleeve and body, said valve sleeve having a surface responsive to fluid pressure in said body downstream of said valve sleeve to urge said valve sleeve toward said valve seat; means providing a second seal between the exterior of said sleeve and body downstream of said first seal to prevent fluid in said body downstream of said sleeve from flowing between the exterior of said sleeve and body; the seal diameter of said first seal being greater than the seal diameter of said second seal to provide a transverse surface between said seals facing in a downstream direction; said body and sleeve providing a space therebetween and between said seals in which said transverse surface is located; said body having another passage establishing fluid communication between the exterior of said body and said space to allow fluid pressure in the conduit externally of said body to pass through said another passage into said space and act on said transverse surface to urge said sleeve in an upstream direction toward said seat, the fluid pressure force upstream of said valve sleeve and acting on said valve sleeve to urge said valve sleeve from its seat being greater than the fluid pressure force in said space and acting on said valve sleeve to urge said valve sleeve toward its seat; and spring means engaging said sleeve to yieldably urge said sleeve upstream toward said seat.

9. In a pressure regulator for fluid flowing through a conduit: a body adapted to be mounted in the conduit and having a fluid passage therethrough; a first valve member in said body providing a valve seat; a second valve member in said body movable downstream from said seat by fluid pressure in said body upstream thereof; means providing a first seal between the exterior of said second member and body to prevent fluid in said body upstream of said second member from flowing between the entire circumference of said exterior of said second member and body, said second member having a surface responsive to fluid pressure in said body thereabove to urge said second member downwardly toward said valve seat; means providing a second seal between the exterior of said second valve member and body downstream of said first seal to prevent fluid in said body downstream of said second member from flowing between the exterior of said second member and body; the seal diameter of said first seal being greater than the seal diameter of said second seal; said body and second member providing a space therebetween and between said seals; said body having another passage establishing fluid communication between the exterior of said body and said space to allow fluid pressure in the conduit externally of said body to pass through said another passage into said space and urge said second member in an upstream direction toward said seat, the fluid pressure force below said second valve member and acting on said second valve member to urge said second valve member upwardly from its seat being greater than the fluid pressure force in said space and acting downwardly on said second valve member to urge said second valve member downwardly toward its seat; and spring means in said space acting on said second member for yieldably urging said second member upstream toward said seat.

10. In pressure regulator apparatus: a conduit; a first pressure regulator in said conduit for reducing the pressure of fluid flowing therethrough; a second pressure regulator in said conduit downstream of said first regulator; means for conducting fluid from the downstream side of said first regulator into the upstream side of said second regulator; said second regulator including a body adapted to be mounted in the conduit and having a fluid passage therethrough; a first valve member in said body providing a valve seat; a second valve member in said body movable downstream from said seat by fluid pressure in said body upstream thereof; means providing a first seal between the exterior of said second member and body to prevent fluid in said body upstream of said second member from flowing between the entire circumference of said exterior of said second member and body; means providing a second seal between the exterior of said second valve member and body downstream of said first seal to prevent fluid in said body downstream of said second member from flowing between the exterior of said second member and body; the seal diameter of said first seal being greater than the seal diameter of said second seal; said body and second member providing a space therebetween and between said first and second seals; said second member having a surface responsive to fluid pressure in said body downstream of said second member to urge said second member toward said valve seat; said body having another passage establishing fluid communication between the exterior of said body and said space to allow substantially the same fluid pressure in the conduit upstream of said first regulator and externally of said body to pass through said another passage into said space and act on and urge said second member downwardly toward said seat, the fluid pressure force upstream of said second valve member and acting on said second valve member to urge said second valve member from its seat being greater than the fluid pressure force in said space and acting on said second valve member to urge said second valve member toward its seat.

11. In pressure regulator apparatus: a conduit; a first pressure regulator in said conduit for reducing the pressure of fluid flowing therethrough; a second pressure regulator in said conduit downstream of said first regulator; means for conducting fluid from the downstream side of said first regulator into the upstream side of said second regulator; said second regulator including a body adapted to be mounted in the conduit and having a fluid passage therethrough; a valve member in said body providing a valve seat; a valve sleeve slidable longitudinally in said body to and from said seat and movable downstream from said seat by fluid pressure in said body upstream thereof; means providing a first seal between the exterior of said sleeve and body to prevent fluid in said body upstream of said sleeve from flowing between the entire circumference of said sleeve exterior and body; means providing a second seal between the exterior of said sleeve and body to prevent fluid in said body downstream of said sleeve from flowing between said sleeve exterior and body; the seal diameter of said first seal being greater than the seal diameter of said second seal to provide a transverse surface on said sleeve between said seals facing in a downstream direction; said body and sleeve providing a space therebetween and between said seals in which said transverse surface is located, said valve sleeve having a surface responsive to fluid pressure in said body downstream of said valve sleeve to urge said valve sleeve toward said valve seat; said body having another passage establishing fluid communication between the exterior of said body and said space to allow substantially the same fluid pressure in the conduit upstream of said first regulator and externally of said body to pass through said another passage into said space and act on said transverse surface to urge said sleeve upstream toward said seat, the fluid pressure force upstream of said valve sleeve and acting on said valve sleeve to urge said valve sleeve from its seat being greater than the fluid pressure force in said space and acting on said valve sleeve to urge said valve sleeve toward its seat.

12. In pressure regulator apparatus: a conduit; a first pressure regulator in said conduit for reducing the pressure of fluid flowing therethrough; a second pressure regulator in said conduit downstream of said first regulator; means for conducting fluid from the downstream side of said first regulator into the upstream side of said second regulator; each of said regulators including a body having a fluid passage therethrough, a first valve member in said body providing a valve seat, a second valve member in said body movable downstream from said seat by fluid pressure in said body upstream thereof, means providing a first seal between the exterior of said second member and body to prevent fluid in said body upstream of said second member from flowing between the entire circumference of said exterior of said second member and body, means providing a second seal between the exterior of said second valve member and body downstream of said first seal to prevent fluid in said body downstream of said second member from flowing between the exterior of said second member and body, the seal diameter of said first seal being greater than the seal diameter of said second seal, said body and second member providing a space therebetween and between said first and second seals, said second member having a surface responsive to fluid pressure in said body downstream of said second member to urge said second member toward said seat; said body of each regulator having another passage establishing fluid communication between its exterior and its companion space to allow substantially the same fluid pressure in the conduit upstream of said first regulator and externally of said bodies to pass through said another passages into said spaces and urge said second members in an upstream direction toward their respective seats; with respect to each regulator, the fluid pressure force upstream of its second valve member and acting on said second valve member to urge said second valve member from its seat being greater than the fluid pressure force in its space and acting on said second valve member to urge said second valve member toward its seat; and spring means engaging the second member of said first regulator for yieldably urging said second member of said first regulator upstream toward its companion seat.

13. In pressure regulator apparatus: a conduit; a first pressure regulator in said conduit for reducing the pressure of fluid flowing therethrough; a second pressure regulator in said conduit downstream of said first regulator; means for conducting fluid from the downstream side of said first regulator into the upstream side of said second regulator; each of said regulators including a body having a fluid passage therethrough, a valve member in said body providing a valve seat, a valve sleeve slidable longitudinally in said body to and from said seat and movable downstream from said seat by fluid pressure in said body therebelow, means providing a first seal between the exterior of said sleeve and body to prevent fluid in said body upstream of said sleeve from flowing between the entire circumference of said exterior of said sleeve and body, means providing a second seal between the exterior of said sleeve and body downstream of said first seal to prevent fluid in said body downstream of said sleeve from flowing between the exterior of said sleeve and body, the seal diameter of said first seal being greater than the seal diameter of said second seal to provide a transverse surface on said sleeve between said seals facing in a downstream direction, said body and sleeve providing a space therebetween and between said seals in which said transverse surface is located, said valve sleeve having a surface responsive to fluid pressure in said body downstream of said valve sleeve to urge said valve sleeve toward said valve seat; said body of each regulator having another passage establishing fluid communication between its exterior and its companion space to allow substantially the same fluid pressure in the conduit upstream of said first regulator and externally of said bodies to pass through said another passages into said spaces and act on said transverse surfaces to urge said sleeves toward their respective seats; with respect to each regulator, the fluid pressure force upstream of its valve sleeve and acting on said valve sleeve to urge said valve sleeve from its seat being greater than the fluid pressure force in its space and acting on said valve sleeve to urge said valve sleeve toward its seat.

14. In a pressure regulator for fluid flowing through a conduit: a body adapted to be mounted in the conduit and having a fluid passage therethrough, said body including a main portion and a sub adjustably and threadedly connected to said main portion, said sub having an external surface longitudinally to one side of said main portion; a first valve member in said body providing a valve seat; a second valve member in said body movable along the inner walls of said sub and main portion downstream from said seat by fluid pressure in said body upstream thereof; spring means surrounding said second member and bearing against said sub and second member to yieldably urge said second member upstream into engagement with said seat; said external surface being adapted to have a tool applied thereto to turn and thread said sub relative to said body to vary the force of said spring means against said second member.

15. In a pressure regulator for fluid flowing through a conduit: a body adapted to be mounted in the conduit and having a fluid passage therethrough, said body including a main portion and a sub adjustably and threadedly connected to said main portion, said sub having an external surface longitudinally to one side of said main portion; a first valve member in said body providing a valve seat; a valve sleeve in said body movable along the inner walls of said sub and main portion downstream from said seat by fluid pressure in said body upstream thereof; spring means surrounding said sleeve and bearing against said sub and sleeve to yieldably urge said sleeve upstream into engagement with said seat; said external surface being adapted to have a tool applied thereto to turn and thread said sub relative to said main body to vary the force of said spring means against said sleeve.

16. In a pressure regulator for fluid flowing through a conduit: a body adapted to be mounted in the conduit and having a fluid passage therethrough, said body including a main portion and a sub adjustably and threadedly connected to said main portion, said sub having an external surface longitudinally to one side of said main portion; a first valve member in said body providing a valve seat; a valve sleeve in said body movable along the inner walls of said sub and main portion downstream from said seat by fluid pressure in said body upstream thereof; means providing a seal between said sleeve and sub to prevent fluid from flowing therebetween; spring means surrounding said sleeve and bearing against said sub and sleeve to yieldably urge said sleeve upstream into engagement with said seat; said external surface being adapted to have a tool applied thereto to turn and thread said sub relative to said main body to vary the force of said spring means against said sleeve.

17. In a pressure regulator for fluid flowing through a conduit: a body adapted to be mounted in the conduit and having a fluid pasage therethrough; a first valve member in said body providing a valve seat; a second valve member in said body movable downstream from said seat by fluid pressure in said body upstream thereof; means for shifting said second valve member into engagement with said seat; said valve members having metallic portions between which fluid flows when said second member moves to open position in a direction downstream from said seat, said metallic portion of said first member having an external cylindrical region; said metallic portion of said second member having an internal cylindrical region conforming in diameter to said external cylindrical region, said external cylindrical region being encompassed by said internal cylindrical region to substantially entirely prevent fluid flow between said metallic portions when said second member is shifted over said seat; and an elastomer seal ring mounted on said first valve member upstream of its external cylindrical region, said elastomer seal ring being surrounded by said internal cylindrical region of said second member in sealing engagement therewith to fully prevent fluid flow in said passage when said second valve member is shifted to a closed position into engagement with said seat.

References Cited by the Examiner

UNITED STATES PATENTS

| | | | |
|---|---|---|---|
| 1,954,044 | 4/1934 | Guildford | 251—210 |
| 2,600,137 | 6/1952 | Teague | 137—505.25 |
| 2,841,171 | 7/1958 | Baker | 137—508 X |
| 2,854,995 | 10/1958 | Lornitzo | 137—508 X |
| 2,920,764 | 1/1960 | Hodges | 137—508 X |
| 3,093,155 | 6/1963 | Dawes | 137—508 X |
| 3,198,481 | 8/1965 | Bryant | 251—210 |

WILLIAM F. O'DEA, *Primary Examiner.*

HAROLD WEAKLEY, *Examiner.*